United States Patent [19]
Shoemaker

[11] 3,876,291
[45] Apr. 8, 1975

[54] TEN POWER MICROSCOPE OBJECTIVE

[75] Inventor: Arthur H. Shoemaker, East Aurora, N.Y.

[73] Assignee: American Optical Corporation, Southbridge, Mass.

[22] Filed: July 9, 1973

[21] Appl. No.: 377,364

[52] U.S. Cl.................... 350/225; 350/175 ML
[51] Int. Cl....................... G02b 9/12; G02b 21/02
[58] Field of Search..... 350/175 ML, 177, 225, 229

[56] References Cited
UNITED STATES PATENTS
2,713,808  7/1955  Klein.................... 350/175 ML UX
3,552,830  1/1971  Shoemaker.................... 350/225 X Primary Examiner—John K. Corbin
Attorney, Agent, or Firm—Alan H. Spencer; William C. Nealon; Howard R. Berkenstock, Jr.

[57] ABSTRACT

A three component microscope objective having a numerical aperture of substantially 0.25 and a magnification of substantially 10X is provided by a three element system. The microscope objective provides correction for the usual chromatic image aberrations as well as spherical aberration, coma, and astigmatism while having a substantially flat image field.

2 Claims, 1 Drawing Figure

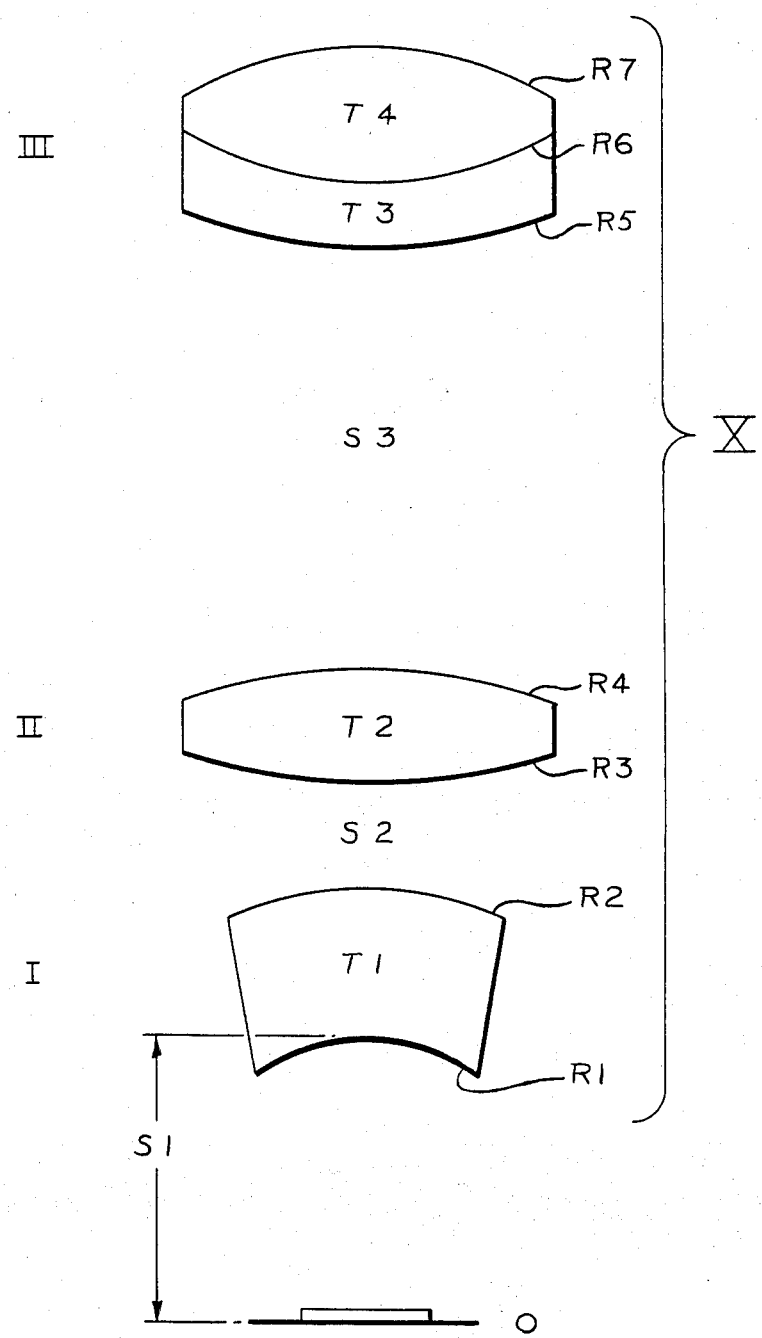

TEN POWER MICROSCOPE OBJECTIVE

THE DRAWING

The drawing is an optical diagram of a microscope objective according to the present invention.

THE INVENTION

This invention relates to improvements in a microscope objective, and in particular to a microscope objective with a numerical aperture of substantially 0.25 and a magnification of substantially 10X. It is the object of this invention to provide such a microscope objective which is well corrected for the usual chromatic image aberrations as well as spherical aberration, coma, and astigmatism, while having a substantially flat image field when used with a telescope objective as described in U.S. Pat. No. 3,355,234 and a typical 10X eyepiece.

FIG. 1 is an optical diagram of the preferred form of the present invention wherein the numeral X designates the objective in general, and numerals I, II, and III designate the three optically aligned components of said objective. The foremost component, component I, is a concavo-convex positive lens followed by a double convex positive lens, component II. Rearmost is a double convex positive doublet, component III.

The lens parameters are as follows: The successive radii are designated R1–R7, where a minus sign indicates radii on centers of curvature lying on the object side of their vertices. The axial thicknesses of successive lenses are designated T1–T4. The axial spaces from the object plane O are designated S1–S3. The refractive indices of the glasses in successive lens element are designated ND1–ND4, and the Abbe Numbers of the successive glasses are designated $\gamma 1 - \gamma 4$. The index of refraction and Abbe Numbers are absolute values.

A preferred embodiment of the invention having a focal length F equal to 18.264 is set forth in the following table.

| Radius R | Thickness T | Space S | Refractive Index ND | Abbe Number $\gamma$ |
|---|---|---|---|---|
|  |  | $S_1$=6.180 |  |  |
| $R_1$= – 7.807 |  |  |  |  |
|  | $T_1$=5.000 |  | $ND_1$=1.78833 | $\gamma_1$=50.47 |
| $R_2$= –10.140 |  |  |  |  |
|  |  | $S_2$=3.925 |  |  |
| $R_3$= 50.269 |  |  |  |  |
|  | $T_2$=3.000 |  | $ND_2$=1.78833 | $\gamma_2$=50.47 |
| $R_4$= –36.657 |  |  |  |  |
|  |  | $S_3$=10.796 |  |  |
| $R_5$= 54.142 |  |  |  |  |
|  | $T_3$=2.000 |  | $ND_3$=1.78446 | $\gamma_3$=25.75 |
| $R_6$= 14.490 |  |  |  |  |
|  | $T_4$=3.500 |  | $ND_4$=1.51673 | $\gamma_4$=67.11 |
| $R_7$= –28.72 |  |  |  |  |

It will be apparent that the foregoing is variable depending on the value of F. Other forms are thus possible and changes may be made in the values of the constructional data based on the relationships with the above charts, without departing from the spirit of this invention.

What is claimed is:

1. A three component microscope objective comprising a concavo-convex positive lens as the first element, a double convex positive lens as the second component and a double convex positive doublet as the third component, wherein the parameters of radii (R), lens thicknesses (T), axial spaces along lens elements and objective plane (S), refractive indices (ND), and abbe numbers ($\gamma$), are determined by the following relationship

|  | Radius R | Thickness T | Space S | Refractive Index ND | Abbe Number $\gamma$ |
|---|---|---|---|---|---|
|  |  |  | $S_1$=.3384F |  |  |
|  | $R_1$= – .4275F |  |  |  |  |
| I |  | $T_1$=.2738F |  | $ND_1$=1.78833 | $\gamma_1$=50.47 |
|  | $R_2$= – .5552F |  |  |  |  |
|  |  |  | $S_2$=.2149F |  |  |
|  | $R_3$= 2.7523F |  |  |  |  |

|  | Radius R | Thickness T | Space S | Refractive Index ND | Abbe Number $\gamma$ |
|---|---|---|---|---|---|
|  |  |  | $S_1$=.3384F |  |  |
|  | $R_1$= – .4275F |  |  |  |  |
| I |  | $T_1$=.2738F |  | $ND_1$=1.78833 | $\gamma_1$=50.47 |
|  | $R_2$= – .5552F |  |  |  |  |
|  |  |  | $S_2$=.2149F |  |  |
|  | $R_3$= 2.7523F |  |  |  |  |
| II |  | $T_2$=.1643F |  | $ND_2$=1.78833 | $\gamma_2$=50.47 |
|  | $R_4$= –2.0071F |  |  |  |  |
|  |  |  | $S_3$=.5911F |  |  |
|  | $R_5$= 2.9644F |  |  |  |  |
| III | $R_6$= 0.7934F | $T_3$=.1095F |  | $ND_3$=1.78446 | $\gamma_3$=25.75 |
|  |  | $T_4$=.1916F |  | $ND_4$=1.51673 | $\gamma_4$=64.11 |
|  | $R_7$= –1.5729F |  |  |  |  |

-Continued

| | Radius R | Thickness T | Space S | Refractive Index ND | Abbe Number γ |
|---|---|---|---|---|---|
| II | | $T_2=.1643F$ | | $ND_2=1.78833$ | $\gamma_2=50.47$ |
| | $R_4=-2.0071F$ | | | | |
| | $R_5= 2.9644F$ | | $S_3=.5911F$ | | |
| III | $R_6= 0.7934F$ | $T_3=.1095F$ | | $ND_3=1.78446$ | $\gamma_3=25.75$ |
| | $R_7=-1.5729$ | $T_4=.1916F$ | | $ND_4=1.51673$ | $\gamma_4=64.11$ |

Wherein scalar values are given in millimeters.

2. The microscope objective of claim 1 wherein the parameters of radii (R), lens thicknesses (T), axial spaces along lens elements and object plane (S), refractive indices (ND), and Abbe Numbers (γ), being determined by the following relationship

| Radius R | Thickness T | Space S | Refractive Index ND | Abbe Number γ |
|---|---|---|---|---|
| $R_1=-7.807$ | | $S_1= 6.180$ | | |
| | $T_1=5.000$ | | $ND_1=1.78833$ | $\gamma_1=50.47$ |
| $R_2=-10.140$ | | | | |
| | | $S_2= 3.925$ | | |
| $R_3= 50.269$ | $T_2=3.000$ | | $ND_2=1.78833$ | $\gamma_2=50.47$ |
| $R_4=-36.657$ | | | | |
| | | $S_3=10.796$ | | |
| $R_5= 54.142$ | $T_3=2.000$ | | $ND_3=1.78446$ | $\gamma_3=25.75$ |
| $R_6= 14.490$ | | | | |
| | $T_4=3.500$ | | $ND_4=1.51673$ | $\gamma_4=67.11$ |
| $R_7=-28.792$ | | | | | wherein scalar values are given in millimeters.

* * * * *